3,676,122
PROCESS FOR THE PRODUCTION OF NEGATIVE OR POSITIVE CONTINUOUS-TONE OR SCREENED IMAGES THEREOF
Ehrhard Hellmig, Leverkusen, Germany, assignor to Agfa-Gevaert Aktiengesellschaft, Leverkusen, Germany
Filed July 2, 1969, Ser. No. 838,475
Claims priority, application Germany, July 8, 1968, P 17 72 812.0
Int. Cl. G03b *27/76;* G03c *7/00*
U.S. Cl. 96—23          5 Claims

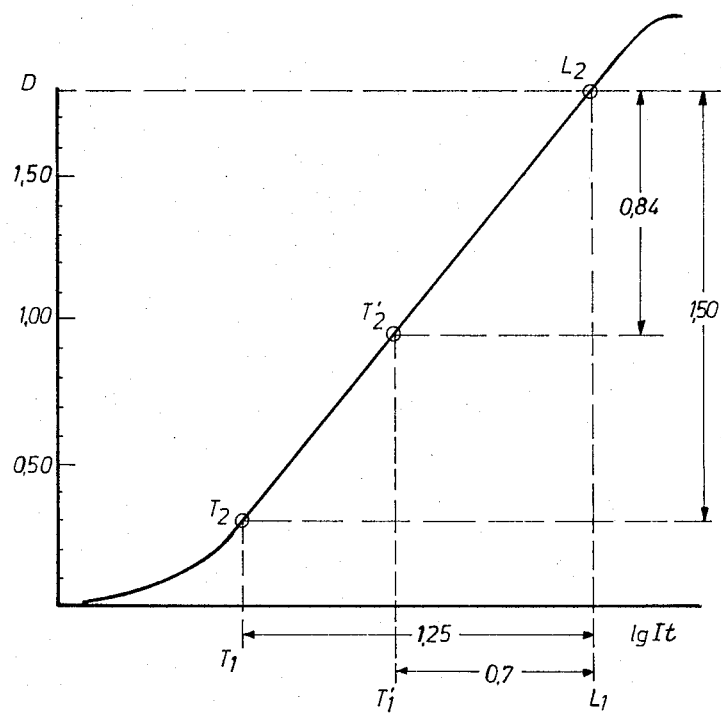

ABSTRACT OF THE DISCLOSURE

A process for the production of negative continuous-tone images from colored originals with different density ranges, wherein the exposure time is determined only by the densities of high-light areas in the original.

---

As a rule, a continuous-tone original is reproduced by initially preparing a negative continuous-tone image from it and then using the negative continuous-tone image to obtain a positive continuous-tone or halftone image, which is used as the original for copying by a subsequent mechanical process (e.g. copy on copying lacquer, photoresist, or pigment paper) to prepare a printing plate. The continuous-tone original may be black-and-white or even a multi-color image on an opaque or transparent support. If the original is in the form of a multi-color image, the negative continuous-tone images are color separation records obtained by means of color separation filters. As a rule, these continuous-tone negatives are produced by an exposure in the reproduction camera, i.e. by way of optical image reproduction. However, they may also be obtained by the contact method. For the sake of simplicity, the verb "to expose" as used in this specification means the formation of a continuous-tone negative by any means, in a camera or by the contact method.

According to common practice, negatives are exposed in such a way that the so-called shadows, irrespective of their value on the originals, all appear in the resulting negatives with the same predetermined density value which corresponds to about 0.30 density units, and which varies somewhat from one reproduction works to another, and which is also adhered to with slightly different tolerances.

In this connection shadow is the darkest density value of importance to the image in the original. Accordingly highlight is the lightest tone value of importance to the image in the original. Contrary thereto in the negative image the shadow is the lightest part and the "light" is the darkest tone value. The "density or blackening range" is the difference in the density values from light to shadow.

Correct exposure in the preparation of a continuous-tone negative involves considerable difficulty and even professionals often have to repeat the preparation of the negative as a result of incorrect exposure, which involves losses both of material and of time.

The main cause of this difficulty lies in the considerable differences in the shadows of the various originals intended for reproduction, which can be from 0.7 to 2.0 in the case of opaque originals, and as much as 0.7 to 3.5 in the case of transparent originals (color transparencies), i.e. extending to beyond more than 2.8 powers of ten. Accordingly, exposures can vary over the wide range from 1 to about 600. If the Schwarzschild-effect is also taken into consideration, this range is even wider. For example, for an average Schwarzschild-exponent of $p=0.85$, which substantially corresponds to reality, this range is from 1 to 2000. This makes it extremely difficult to select the right exposure in this extended range. Moreover there are further complicating factors to be taken into consideration, including the difficulty that, when development is subsequently carried out (tray development), the sensitivity of the continuous-tone material depends in a manner difficult to control on the development time. Furthermore the inconstancy of the Schwarzschild-exponent over an extended exposure range leads to uncontrollable results. Another complicating factor is the influence of scattered light on the shadows, which is very noticeable during exposure, and also exerts uncontrollable influences on the quality of the continuous-tone negative. By the term Schwarzschild-effect we understand the reciprocity law failure (see Mees, "The Theory of the Photographic Process," chapter 6, revised edition 1954, published by The MacMillan Co., New York).

Apart from these disadvantages which affect the quality of the negatives there are also disadvantages with respect to the processing, in that the exposure time has to be recalculated for each original, which in turn means that the camera itself has to be readjusted (for example, by means of an exposure timer or possibly stop).

It is clear that a procedure such as this greatly affects rationalization.

It is among the objects of the present invention to simplify and to rationalize the production of negative continuous-tone images.

We now have found a process for the production of negative continuous-tone images or negative color separation records by contact or in a camera starting from black-and-white or colored originals differing in their density range, in which the exposure time for each negative is determined solely by the density of the light areas in the original, irrespective of its density range, and following exposure, each negative is subjected to identical development.

According to common practice, the exposure time for the negatives is always determined by the density of the shadows (black parts) in the originals. The process according to the invention represents a reversal of this practice. This is of considerable advantage because the light areas vary within a much narrower density range than the blacks, with the result that the exposure times also differ within a much narrower range. Acccording to the range in which the densities of the light areas vary, which is about 0.5, the exposures are in a range from 1 to 3, in other words, the longest exposure time is three times the shortest exposure time (the ratio is about 1:4 for the Schwarzschild-exponent $p=0.85$). Thus, the process according to the invention (exposure calculated from the light portions) yields images which show the same density in their light areas, provided development is kept constant. With such a narrow exposure range as this, the influence of the Schwarzschild-effect is rather unimportant and may be neglected.

Another advantage is the elimination of the influence of scattered light because it can only be effective in the very light areas of the negative, which however only occur in originals with very high contrast. In addition to this, processing is much simpler insofar as there is no need at all to adjust the shutter stop, whilst the exposure timer need only be adjusted within a limited time range, thus minimizing the possibility of errors.

To illustrate the principle underlying the invention, the density curve of a photographic material is shown in the accompanying figure in the form of a graph in which the density (D) is plotted as ordinate against log exposure $=\lg It$ (I=exposure intensity, $t$=exposure time) as the abscissa. The gamma ($\gamma$) above a density D=0.3 amounts to 1.20.

If an original with a density range of 1.25 is to be reproduced, exposure being carried out in such a way that the lights ($L_1$) of the original are reproduced with a density of 1.8 in the negative (point $L_2$), the shadow ($T_1$ in the original) takes the density $T_2$=0.3 in the negative. The density range of the negative thus amounts to 1.80 to 0.30=1.50.

Reproduction of a second original with a density range of 0.70, the lights of which are also reproduced with a density of 1.80 in the negative results into a density of the shadow portions in the negative of $T'_2$=0.96. In this instance, the contrast range of the exposure amounts to 1.80 minus 0.96=0.84.

The preceding example demonstrates that, unlike conventional photographs, photographs composed in accordance with the invention are constant in their light areas and variable in their shadow areas. Accordingly, they generally also have an appearance which differs in this respect from that of conventionally taken photographs. Technically, this is not a disadvantage because the negative is only an intermediate and not final product. An exposure such as this (with its higher dark areas) is technically equivalent to a conventionally taken exposure with a normal density for the dark area (for example D=0.3) but with the same density range.

If it is desired to reproduce originals with greater density ranges than 1.5 in this way, a second film with a flatter $\gamma$-value (for example $\gamma$=0.80) is required. When two or even more films of different gamma are used, it is of advantage, so far as automating or rationalizing exposure is concerned, to employ photographic films of equal sensitivity. In this context, "equal sensitivity" means the same exposure time for producing the same density for "the light" in the negative (for example density 1.8), in contrast to the usual definition (threshold sensitivity, cf. DIN 4512, sheet 1). However, equal sensitivity may also be adjusted after preparation of the photographic film by exposing the more sensitive film to light with rays that have been suitably weakened by a light-reducing means (e.g. a step or grey filter).

When reproducing colored originals, three color separation records are similarly prepared. In order to obtain the same exposure times for the yellow, magenta and cyan separation records and, where desired, for further separation records, (e.g. black separation record) on the same photographic film, the corresponding colored light has to be weakened in such a way as to obtain same filter factors, i.e. same exposure times for producing the predetermined light densities on the continuous-tone negative (for example $D_L$=1.80). In this instance, too, the spectral sensitivity of the continuous-tone color separation films is with advantage adjusted during production of the film in such a way that, without any additional weakening of light, filter factors 1:1:1 are obtained for blue-, green- and red-filter exposure, based on a predetermined light density $D_L$ in the continuous-tone negative (for example $D_L$=1.80), at least for the light source most frequently used in practice.

It has been presupposed in the foregoing that the negatives are exposed "exactly related to the lights," in which case the exposure time required was determined from the density of the lights in the original.

It is possible to go one step further and always to expose all originals, irrespective of the differences in the density of their light areas, for the same period. Naturally, the period selected must be such that, of all the originals to be reproduced, the original with the highest density of light also leads to a satisfactory exposure. Although this means that the density of the light areas in the exposures is not exactly the same for all the originals, but differs depending upon the light of the original, this difference is small. For a film with a gamma of $\gamma$=1.0, it corresponds exactly to the difference in the original (max. 0.5), and may readily be compensated in the subsequent reproduction stage (continuous-tone print or screen image to the positive, see below) by a correspondingly adjusted exposure time. This dispenses not only with the need to calculate and set the exposure time on the camera before each continuous-tone exposure, but also with the need to sort out the originals in accordance with the density of their light areas.

This procedure has the advantage of extreme simplicity and speed, coupled with the advantage of almost total elimination of the Schwarzschild-effect. Accordingly, it contributes towards rationalizing procedural technique and the quality of the final product.

In addition to conventional films (with "fixed" gamma), one of the known materials the gamma of which is arbitrarily variable between a maximum and a minimum value in dependence upon the color of the light (with "print-variable gamma," cf. "Reprorama" (1967), No. 29, published by Agfa-Gevaert AG), is also particularly suitable for producing negatives from black-and-white originals by the process according to the invention. Exposure of such a material with blue light leads to flatter gamma, whilst exposure with yellow light leads to a steeper gamma ($\gamma$=0.70 and 1.40 respectively). On exposure with mixed light, all the intermediate values may be adjusted in dependence upon the blue/yellow-ratio of the light used for exposure. By the term print-variable gamma or gamma variable we understand photographic materials with at least one silver halide emulsion layer, the gamma value of which can be varied by changing the color of the light used for the exposure.

It is essential for the rational procedure according to the invention that this material should be adjusted in such a way that the same density is always obtained for the lights in the negative for the same exposure time, irrespective of the color of the light. In the present context, the color of the light is the component of the blue/yellow exposure, whilst equal exposure time is the sum of the exposure times for yellow-plus blue-exposure. The aforementioned adjustment of sensitivity is carried out in such a way that the same density is obtained for the lights in the negative (for example $D_L$=1.80) both for blue exposure alone and for yellow exposure alone with the same exposure time. This can be achieved by weakening the intensity of the stronger of the two lights in the negative to such an extent that equal sensitivity is obtained for both types of light (for example by interposing a grey filter of suitable density in the path of rays of the stronger lights in the negative). If this adjustment is carried out for the blue and yellow light in the negative, it applies to all component blue/yellow-exposures, usually with sufficient accuracy.

In routine reproduction, continuous-tone photographs are best exposed onto print-variable material by means of a suitable apparatus which automatically selects the light color (component blue/green exposure) in dependence upon the density range of the original, and at the same time performs exposure. An apparatus of this kind is described, for example, in the journal "Reprorama" 1967, No. 9 and French patent specification No. 1,557,559.

As in cases where conventional photographic materials are used, the exposure time (overall exposure time) may either be left constant for all originals, or alternatively the light areas of the originals may be exactly exposed in order to obtain perfectly standardized exposures.

Since, even under constant processing conditions, films of print-variable gamma allow the gamma to be adjusted to the density range of the original to be reproduced, it is possible, directly from the exposure, to obtain negatives which are constant in density not only in the light areas but also in the shadow areas and are thus very similar to or, with a careful photographic technique, are even equivalent in their appearance to negatives produced conventionally by varying the development baths.

The production of negatives by the process according to the invention is not limited to the preparation of photographs all on the same size, based on the original. If reproduction is carried out with a varying scale of enlargement, one of the known means will be used to maintain a constant exposure intensity in the plane of the film. One example of such a means is the so-called stop controlling band by which the size of the lens stop is automatically regulated in dependence upon the reproduction scale (camera extension) in such a way that the exposure intensity always remains constant in the plane of the film. It is also possible, however, to use other technical means, for example light integrators, for the same purpose.

The negatives obtained by the procedure according to the invention are then further processed into continuous-tone positives or even into screen positives. Since these positives have to satisfy certain standard densities (for light and shadow areas), because they represent the original to be copied in the subsequent preparation of a printing plate (e.g. a copy on photomechanical copying layers, photoresist, pigment paper or photographic transfer films), standardization has to be undertaken with this step. This can be done by hand in known manner during development of the copies by compensating the differences in the density ranges in the negatives through the development time.

In a rationalized procedure, in which the copies are developed in a developing machine, one of the known materials with print-variable gamma will again be used.

According to the invention, the copying material is also used with special adjustment of the sensitivity of the blue- and the green- (yellow-) sensitive component emulsions. However, this adjustment is carried out in a completely different manner from that usually required for the photographic material, namely in such a way that the same density value is obtained for the lights in the copy (for example 0.25) both with blue exposure through the lights of the negative and with yellow exposure, both over the same period. This adjustment should be carried out in a manner similar to that described above by accordingly weakening the more intensive of the two yellow or blue paths of rays by the interposition of light-reducing means.

All the negatives, providing they show only the constant density in their light areas (in the example: 1.8), may then always be copied over the same period, in which case the exposure time in the case of mixed exposure is again the sum of the component exposure times for yellow- and blue-exposure. The only action required is to determine the ratio of exposure, which of course determines the gamma of the copying material and is governed by the density range of the negative (for example by calibration curve or a table).

In this case, too, it is best to use an automatic apparatus which is adjusted to the constant density for the light once and only once and calculates and even carries out the component exposures yellow/blue only after the "dark areas" have been fed into it. Since the machine only needs to be adjusted once in each instance, work flow and reliability are increased.

If the continuous-tone negatives are to be further processed into halftone positives, the process according to the invention is similarly carried out, except that the copying material is a film of high gamma (so-callled lith film) the gamma of which does not vary with the color of the light. One of the known colored contact screens, for example a magenta screen, is inserted between the continuous-tone negative and the copying film.

As in the case of the continuous-tone copy, the stronger of the two copying lights (blue/yellow) is weakened until the density of the light areas in the continuous-tone negative (for example 1.8) produces the same density of the required degree on the halftone copy both for blue and for yellow light. Since halftone dots are formed in this case, the "density of the light areas" is the integral density according to DIN-Standard 16,600 measured over numerous halftone dots. A specific size of these halftone dots corresponds to it.

The other operation corresponds to that carried out with the continuous-tone copy. It may also be carried out automatically with a suitable apparatus (for example a Gevaerex apparatus), resulting in the same advantages.

What is claimed is:

1. In the process of producing in a photographic printing apparatus a plurality of continuous-tone images or negative color separation records by exposure, either by optical image reproduction or by contact, starting from opaque or transparent black-and-white or colored originals having differing density ranges, the steps of exposing a plurality of originals in which the major highlight areas vary in density within a range of no more than about 0.5, each original being exposed for an exposure time for each negative produced of a period length determined solely by the density of said major highlight areas as measured by a densitometer and within a range of exposure times of 1 to 3 for the plurality of originals to obtain negative images or separation records having a constant density in the light areas, and then developing each image or record by substantially the same development process.

2. In the process for producing in a reproducing apparatus a plurality of continuous-tone images or negative color separation records by exposure, either by optical image reproduction or by contact, starting from opaque or transparent black-and-white or colored originals having differing density ranges the steps of exposing a plurality of originals in which the major highlight areas vary in density within a range of no more than about 0.5, each original being exposed for the same exposure time for each negative produced, which is a period length determined by the major highlight of said plurality of originals having the highest density, so that the constant exposure time is of the order of the longest exposure time determined by the major highlight, to obtain negative images or separation records at a high rate of speed, and then developing each image or record by substantially the same development process.

3. The process of claim 1, wherein for the production of the negative a light-sensitive photographic material with at least one silver halide emulsion layer, the gamma of which varies with the color of the light and the sensitively of which for each of two color $L_1$ and $L_2$ of light is adjusted in such a way that for the same exposure time with light of color $L_1$ on the one hand and light of color $L_2$ on the other hand and/or component exposures with $L_1$ and $L_2$, substantially the same density is obtained in the exposure, being of the order of the required density for the lights in the negative.

4. A process for the production of continuous-tone positives starting from a continuous-tone negative obtained according to the process of claim 1 as the copying original, wherein the copying material is a light-sensitive photographic material with at least one silver halide emulsion layer the gamma of which varies with the color of the light and the sensitivity of which is adjusted in such a way that, for the same exposure time with light of color $L_3$ on the one hand and light of color $L_4$ on the other hand and/or component exposures with $L_3$ and $L_4$, substantially the same density is always obtained in the copy, being of the order of the required density for the light.

5. A process for the production of positive halftone photographic images starting from a continuous-tone negative obtained according to claim 1 as the copying original, including the step of exposing copying film of a high gamma of at least 5 and a colored contact screen arranged between the copying original and the copying material to be exposed, the optical density of which is variable by the color of the copying light, wherein the sensitivity of the photographic copying material to the light colors $L_1$ and $L_2$ is adjusted in such a way that, for the same exposure time with of color $L_1$ on the one hand and with light of color $L_2$ on the other and/or component exposures with $L_1$ and $L_2$, substantially the same dot size in the halftone positive is obtained, being of the required order for light portions in the positive.

References Cited
UNITED STATES PATENTS

| | | | |
|---|---|---|---|
| 2,971,841 | 2/1961 | Moore | 96—30 |
| 3,304,178 | 2/1967 | Atkinson | 96—23 |

NORMAN G. TORCHIN, Primary Examiner

A. T. SURO PICO, Assistant Examiner

U.S. Cl. X.R.

96—17, 45